United States Patent
Krampell et al.

(10) Patent No.: US 12,179,793 B2
(45) Date of Patent: Dec. 31, 2024

(54) DRIVER CONTROLLING SYSTEM FOR A VEHICLE

(71) Applicant: Volvo Car Corporation, Gothenburg (SE)

(72) Inventors: Martin Krampell, Gothenburg (SE); Markus Löfgren, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 192 days.

(21) Appl. No.: 18/053,112

(22) Filed: Nov. 7, 2022

(65) Prior Publication Data

US 2023/0141439 A1    May 11, 2023

(30) Foreign Application Priority Data

Nov. 8, 2021    (EP) .................................... 21206954

(51) Int. Cl.
*B60W 60/00* (2020.01)
*B60W 10/04* (2006.01)
*B60W 50/08* (2020.01)
*B60W 50/10* (2012.01)

(52) U.S. Cl.
CPC .......... *B60W 60/001* (2020.02); *B60W 10/04* (2013.01); *B60W 50/085* (2013.01); *B60W 50/10* (2013.01); *B60W 2420/00* (2013.01); *B60W 2540/00* (2013.01)

(58) Field of Classification Search
None
See application file for complete search history.

(56) References Cited

U.S. PATENT DOCUMENTS

| 10,077,056 B1 * | 9/2018 | Fields | B60W 50/0098 |
| 10,543,853 B2 * | 1/2020 | Toyoda | B60W 40/09 |
| 10,725,467 B2 * | 7/2020 | Meier | G05D 1/0066 |

(Continued)

FOREIGN PATENT DOCUMENTS

| DE | 102020124755 A1 | 4/2021 |
| EP | 3690855 A1 | 8/2020 |

OTHER PUBLICATIONS

Extended EP Search Report for EP Application No. 21206954.6 dated May 16, 2022.

(Continued)

*Primary Examiner* — Jonathan M Dager
(74) *Attorney, Agent, or Firm* — Amin, Turocy & Watson, LLP

(57) ABSTRACT

The present disclosure relates to a driver controlling system for a vehicle comprising a propulsive actuator unit, a propulsive sensor unit, and a control unit. The control unit prompts the propulsive actuator unit to apply a driving parameter in an automated driving mode of the vehicle. The driving parameter is based on a driving preference of a driver. The control unit further modifies the driving parameter of the automated driving mode by a defined rate of deviation for causing a reaction of the driver. The propulsive sensor unit generates driver engagement data based on the reaction of the driver to the modified driving parameter. The rate of deviation may be varied and/or the driving parameter may be incrementally modified from a prior modified driving parameter by the defined rate of deviation, in case of insufficient reaction of the user.

20 Claims, 2 Drawing Sheets

(56) References Cited

U.S. PATENT DOCUMENTS

| | | | | |
|---|---|---|---|---|
| 10,981,563 | B2* | 4/2021 | Nojoumian | B60W 30/025 |
| 11,107,002 | B2* | 8/2021 | Tuzi | G06N 7/01 |
| 11,130,487 | B2* | 9/2021 | Tan | B60W 30/16 |
| 11,221,623 | B2* | 1/2022 | Nojoumian | B60W 40/09 |
| 11,422,553 | B2* | 8/2022 | Sadeghi | B60W 50/00 |
| 11,458,974 | B2* | 10/2022 | McNew | B60W 40/09 |
| 11,479,252 | B2* | 10/2022 | Ji | H04W 4/90 |
| 11,572,072 | B2* | 2/2023 | Kim | B60W 40/09 |
| 11,577,743 | B2* | 2/2023 | Urano | B60W 50/14 |
| 11,835,954 | B2* | 12/2023 | Kawamoto | B60W 30/085 |
| 2014/0379171 | A1* | 12/2014 | Kim | B60W 50/00 |
| | | | | 701/2 |
| 2015/0149017 | A1* | 5/2015 | Attard | B60W 30/18163 |
| | | | | 701/23 |
| 2015/0158486 | A1* | 6/2015 | Healey | B60W 30/16 |
| | | | | 701/23 |
| 2015/0203108 | A1* | 7/2015 | Loria | B60W 50/0098 |
| | | | | 701/1 |
| 2015/0284008 | A1* | 10/2015 | Tan | B60W 10/20 |
| | | | | 701/28 |
| 2017/0057517 | A1* | 3/2017 | Huq | B60W 50/082 |
| 2017/0225677 | A1* | 8/2017 | Yoshida | A61B 5/6893 |
| 2018/0105186 | A1* | 4/2018 | Motomura | G08G 1/0962 |
| 2018/0113461 | A1* | 4/2018 | Potnis | B60W 50/00 |
| 2018/0229723 | A1* | 8/2018 | Jiang | G05D 1/0088 |
| 2019/0071100 | A1* | 3/2019 | Xavier | G05D 1/0061 |
| 2019/0072960 | A1* | 3/2019 | Lin | B60W 40/09 |
| 2020/0094815 | A1* | 3/2020 | Tan | B60W 10/20 |
| 2020/0139992 | A1 | 5/2020 | Oba | |
| 2020/0247429 | A1* | 8/2020 | Tram | G06F 18/2178 |
| 2020/0387156 | A1* | 12/2020 | Xu | G05D 1/0212 |
| 2021/0300365 | A1* | 9/2021 | McCormick | B60K 35/65 |
| 2021/0398014 | A1* | 12/2021 | Cao | G06N 7/01 |
| 2022/0126864 | A1* | 4/2022 | Moustafa | G06T 1/0007 |
| 2022/0161811 | A1* | 5/2022 | Lu | B60W 60/0053 |
| 2022/0188667 | A1* | 6/2022 | Burisch | G08G 1/166 |
| 2022/0274603 | A1* | 9/2022 | Karve | G06N 3/047 |
| 2023/0143814 | A1* | 5/2023 | Krampell | B60W 50/14 |
| | | | | 701/23 |
| 2023/0219569 | A1* | 7/2023 | Zhao | B60W 60/001 |
| | | | | 701/23 |
| 2023/0227037 | A1* | 7/2023 | Zhao | B60W 40/105 |
| | | | | 701/1 |
| 2024/0025404 | A1* | 1/2024 | Gupta | B60W 50/10 |
| 2024/0034362 | A1* | 2/2024 | Oba | B60W 60/0051 |

OTHER PUBLICATIONS

Communication Pursuant to Article 94(3) EPC for EP Application No. 21206954.6 dated May 6, 2024.

* cited by examiner

DRIVER CONTROLLING SYSTEM FOR A VEHICLE

CROSS-REFERENCE TO RELATED APPLICATIONS

This application claims the benefit of and priority to pending EP patent application serial number 21206954.6, filed Nov. 8, 2021 and entitled "DRIVER CONTROLLING SYSTEM FOR A VEHICLE," the entirety of which is hereby incorporated by reference herein.

TECHNICAL FIELD

The present disclosure relates to a driver controlling system for a vehicle, a vehicle comprising such a driver controlling system, a driver controlling method for a vehicle and a computer program element for such a driver controlling system.

BACKGROUND ART

As autonomous driving technology for vehicles improves, the vehicles take over operational decisions for the users and users travelling with such vehicles operate them more and more passively. Driver-assisted vehicles may provide a continuous assistance to the drivers such as speed control and/or steering assistance and the drivers remain actively in the driving task. However, human performance degrades quickly beyond a certain level of automation of the vehicle. In other words, the better the autonomous driving technology becomes the worse capabilities of the drivers to react properly in a potentially critical situation.

There are some monitoring devices or methods to control an engagement of the driver. Among them, a torque- or capacitive-based hands-on wheel detection is commonly applied. However, such monitoring system is not sufficient to distinguish between an active driver and just one who rests their hand on the steering wheel. In addition, a camera-based driver monitoring device is also used, which assumes the driver's engagement if the driver looks out a windshield of the vehicle.

However, such monitoring devices monitor the driver in a passive way. Thus, they may not be able to detect an active engagement of the driver during driving the vehicle or measure how large the engagement and/or a reaction of the driver is.

SUMMARY

Hence, there may be a need to provide an improved driver controlling system, which may monitor an active engagement of a driver during driving a vehicle.

The problem is at least partially solved or alleviated by the subject matter of the independent claims of the present disclosure, wherein further aspects are incorporated in the dependent claims. It should be noted that the aspects of the disclosure described in the driver controlling system for a vehicle, the vehicle comprising such a driver controlling system, the driver controlling method for a vehicle and the computer program element for such a driver controlling system.

According to the present disclosure, a driver controlling system for a vehicle is presented. The driver controlling system comprises a propulsive actuator unit, a propulsive sensor unit and a control unit. The control unit is configured to prompt the propulsive actuator unit to apply at least one driving parameter in an automated driving mode of the vehicle. The at least one driving parameter is based on a driving preference of a driver. The control unit is further configured to modify the at least one driving parameter of the automated driving mode by a defined rate of deviation for causing a reaction of the driver. The propulsive sensor unit is configured to generate driver engagement data based on the reaction of the driver to the at least one modified driving parameter.

The driver controlling system according to the present disclosure allows selectively altering characteristics or control of the vehicle to measure a driver's engagement. Even an almost imperceptible small change can induce a significant effect to the driver as long as the driver is actively engaged in a driving task. In particular, by slightly modifying at least one driving parameter applied in the automated driving mode to propel the vehicle, the driver may perceive a deviation of a driving path and take over a physical control of the vehicle and/or change his/her behavior. In case of insufficient or no reaction of the driver to the modified driving parameter, the control unit may consider it as an insufficient or no engagement and/or supervision of the driver. Accordingly, the driver's engagement and/or supervision in the driving task may be actively measured or even gauged based on if and how large their reaction is.

As autonomous driving technology for vehicles improves, drivers are generally no longer engaged in the driving and therefore disconnected from a situation awareness perspective, but also from an ability of reacting to a critical situation properly. By making sure the driver's engagement on a sufficient level, a degradation of human performance or control on the vehicle may be measured and avoided. Accordingly, an optimal balance between function capabilities of the automated driving mode of the vehicle and maintaining a role of the driver as a supervisor may be achieved.

The driver controlling system may be a part of a driver assistance system, which may allow the vehicle to take over operational decisions during driving. The vehicle may drive in the automated mode, in which the vehicle provides a continuous assistance to the driver such as speed control and/or steering assistance and the driver remains actively in the supervising task. In some cases, the driver may also share the operational decisions with one or more control systems, for instance for a lateral steering control system, on a specific level. Alternatively, the vehicle may drive in an autonomous mode, in which the vehicle takes a full propulsion control. The driver controlling system may be suitable for an autonomous driving vehicle with a level between 0 and 4.

The propulsive actuator unit may be configured to apply the at least one driving parameter to propel the vehicle. The propulsive actuator unit may comprise for instance a longitudinal drive control means, a lateral drive control means, an electric front axle drive unit, an electric rear axle drive unit, a steering wheel actuator means, a brake unit or the like.

The control unit may be an electronic control unit (ECU) of the vehicle and configured to perform a powertrain control, brake control and/or transmission control. The control unit may be configured to receive for instance environment data from at least one environment sensing device and/or a navigation device and determine the at least one, preferably a plurality of driving parameters. Such driving parameters may be sent to the propulsive actuator unit to propel the vehicle at least partially or entirely in an automated driving mode.

Additionally or alternatively, the driving parameter determined by the control unit may be based on a driving behavior of the driver. In other words, the driving parameter may reflect operational preferences of the driver for driving the vehicle. Thus, the driving parameter may include an acceleration rate, a deceleration rate, lane-changing, a speed of cornering and/or a driving speed (e.g., a speed equal to a speed limit, a speed that is 10% under/over the speed limit, a speed equal to other cars traveling a route, a speed within a speed range, etc.).

The determined driving parameters may be the optimal parameters to reliably and safely drive the vehicle in the automated mode. However, the control unit may slightly modify the at least one driving parameter determined by the control unit for the automated driving mode by a defined rate of deviation. The defined rate of deviation may be for instance 0.5%, 1%, 5%, etc. Generally, vehicle drivers perceive even a very small change, particularly in case of a change of a longitudinal driving control and/or a lateral driving control. Hence, the rate of deviation can be so small that it can just cause any reaction of the driver. However, it is important that the modified driving parameter(s) should still fulfill safety requirements of the vehicle driving in the automated mode.

The propulsive sensor unit may be arranged at the propulsive actuator unit and configured to monitor whether the driver provide the reaction in response to the at least one modified driving parameter. The reaction may be a manual input of the driver to adjust the modified driving parameter to a primary driving parameter determined by the control unit for the automated driving mode.

For instance, if the driver prefers driving at a center of a lane, the operating parameter defining a position of the vehicle within the lane may be set at a center of the lane in the automated driving mode. However, to cause a reaction of the driver, the control unit may modify the position of the vehicle such that the vehicle drives temporarily offset from the center of the lane. If the driver perceives such a change, the driver may operate manually to move the vehicle in the center of the lane back. The propulsive sensor unit may detect such a manual input of the driver as the reaction to the modified driving parameter and generate the driver engagement data accordingly.

However, the driver may also react to the modified driving parameter without perceiving or knowing it. In other words, the driver's perception to the modified driving parameter may not be necessary. Thus, the driver may not feel that the vehicle is interfering with his/her interaction, supervision or engagement in the driving task.

Accordingly, the driver controlling system may induce an active reaction of the driver, who may try to adjust the modified driving parameter(s) to a familiar driving parameter, which may be the driving parameter originally determined by the control unit for the automated driving mode. As a result, an active engagement or supervision of the driver via a physical control during the automated driving mode may be realized. Further, the driver's engagement and/or supervision in the driving task may be actively measured or even gauged based on if and how large their reaction is.

In an example, the driver engagement data comprising a degree of the reaction of the driver. The propulsive sensor unit may be able to not only detect the reaction of the driver to the modified driving parameter but also measure an intensity of the reaction. Accordingly, the control unit may assess based on the driver engagement data whether the driver's reaction is sufficient to consider as an active engagement in the driving task or not. Further, the control unit may be able to adjust the rate of deviation applied to the modified driving parameter with respect the degree, in other words level or gauge, of the reaction of the driver.

In an example, the control unit is further configured to modify two or more driving parameters of the automated driving mode and the propulsive sensor unit is configured to identify at which modified driving parameter the driver provides the reaction. The control unit may be configured to modify various driving parameters, which may be determined by the control unit with respect to the driving preference of the driver for the automated driving mode of the vehicle.

The propulsive sensor unit may be configured to generate the driver engagement data based on the driver's reaction to the various modified driving parameters. The control unit may be configured to assess to which modified driving parameter the driver mostly reacts. The driver may be more sensitive to a change of a specific driving parameter than a change of another driving parameter and provide a different reaction. Accordingly, the control unit may be capable to correlate the driver's reaction with the modified driving parameters. Based on the driver engagement data and/or the correlation of the driver's reaction with the modified driving parameters, the control unit may be able to select a driving parameter to be modified in the future to control the engagement of the driver during the automated driving mode.

In an example, the driving parameter is based on a change of kinematics of the vehicle. The driving parameter comprises at least one of a distance to a preceding vehicle, a position in a lane, curve entry time, curve exit time, a curve entry speed, curve exit speed, an overriding torque, a turning speed, an acceleration rate and a deceleration rate. The driving parameter to be temporarily modified may be selected such that the modified driving parameter may influence the kinematics and/or a positioning into a specific situation of the vehicle, which diverges from a normal familiar positioning, even when the kinematics of a maneuver are identical. However, the modified driving parameter (s) and/or the changed kinematics may still fulfill safety requirements of the vehicle.

The driving parameter may be for instance a longitudinal driving parameter and/or a lateral driving parameter of the vehicle. The longitudinal driving parameter may be related to a regulation of a vehicle's cruise function such as cruise speed of the vehicle and/or inter-vehicular distance between two vehicles. The longitudinal driving parameter may comprise at least one of a relative distance to a preceding vehicle, a relative speed to the preceding vehicle, a longitudinal acceleration rate and a longitudinal deceleration rate of the vehicle.

Meanwhile, the lateral driving parameter may be related to a path tracking such as lane following, lane change maneuver, collision avoidance, etc. The lateral driving parameter may comprise at least one of a position within a lane, an override torque, a steering wheel behavior, a lane change time, a curve entry time, a curve exit time, a lateral acceleration rate and a lateral deceleration rate of the vehicle.

In an example, the control unit is configured to modify the at least one driving parameter prior to a maneuver required depending on a road situation undergoing in a change. The control unit may communicate with a navigation system, which may be arranged in the vehicle and configured to generate navigation data by calculating a route from a current position to a requested destination. The control unit may thus receive information about the forthcoming route.

If the control unit identifies a need of a tactical maneuver based on the navigation data such as sharp curve, living street, lane change or merge, on- or off-ramp or the like, the control unit may modify the at least one driving parameter for causing a reaction of the driver to the modified driving parameter(s).

Additionally or alternatively, the control unit may also alert the driver by modifying the at least one driving parameter in case of a heavy weather condition.

In an example, the driver controlling system further comprises a driver sensor unit configured to monitor the driver any driver-related measurements such as a posture of the driver, whether the driver supervises the vehicle driving in the automated mode, and generate driver monitoring data. The driver sensor unit may be configured to monitor, whether the driver pays attention to a road ahead and/or monitors surroundings of the driving path even in the automated driving mode of the vehicle. The driver sensor unit may utilize various devices to monitor the driver, which may generate driver monitoring data based thereon.

The devices may comprise at least one of steering wheel sensors to measure torque or capacitive touch, camera or other interior sensing technology designed to monitor driver's physical state. A reaction from the driver could essentially be of any change of behavior or state. It could even be that of vocal utterances as a result of surprise/anger to the adaptation. Likewise, it may also be of changing of function setting/enabling/disabling and/or any interaction with the screens or physical interior.

In an example, the driver sensor unit is based on a contact on a steering wheel of the driver and/or an optical image of the driver. The driver sensor unit may comprise a hand-on wheel detection system comprising at least one capacitive sensor element and/or a torque sensor element. The hand-on wheel detection system may be configured to detect whether the driver holds the steering wheel and generate the steering wheel contact data accordingly. Additionally or alternatively, the driver sensor unit may comprise a camera-based driver monitoring system configured to capture at least one of gaze direction, gaze pattern and fixation point of the driver. Particularly, the camera-based driver monitoring system may monitor, if the driver observes surroundings through a windshield of the vehicle and generate gaze data accordingly. Accordingly, the driver monitoring data may comprise the steering wheel contact data and/or the gaze data.

By implementing both of driver's physical control of the vehicle by modifying the at least one driving parameter and monitoring of the posture of the driver, an active engagement of the driver in form of a human-automation interaction may be ensured and the degree of engagement of the driver may be measured.

In an example, the control unit is configured to vary the rate of deviation for modifying at least one driving parameter based on the driver engagement data and/or the driver monitoring data. The control unit may be configured to receive driver engagement data generated based on the reaction of the driver to the at least one modified driving parameter and/or the driver monitoring data comprising at least one of the steering wheel contact data and gaze data of the driver generated by the driver sensor unit. The control unit may be further configured to perform an assessment based on those data, whether the driver actively supervises the vehicle, which is driving at least partially in the automated mode.

If the control unit determines that the driver does not sufficiently pay attention to the surroundings or provide no reaction to the modified driving parameter, the control unit may increase the rate of deviation. In contrast, if the control unit determines that the driver is sufficiently engaged in the monitoring of the surroundings and/or reacts to the modified driving parameter properly, the control unit may decrease the rate of deviation. Accordingly, a dynamic controlling of the driver may be realized. However, it is important that the modified driving parameter(s) should still fulfill safety requirements of the vehicle driving in the automated mode.

In an example, the control unit is further configured to modify the driving parameter incrementally from a prior modified driving parameter by the defined rate of deviation, in case of insufficient reaction of the driver. In case of lack of reaction to the modified driving parameter of the driver, the control unit may iteratively modify the driving parameter to cause any driver's reaction deemed appropriate for the active engagement of the driver. The control unit may repeat or continue to propel the vehicle with the primary modified driving parameter. Alternatively, the control unit may gradually increase the rate of deviation for modifying the driving parameter or continue to modify the driving parameter by the defined rate of deviation. Accordingly, a dynamic controlling of the driver may be realized. However, it is important that the modified driving parameter(s) should still fulfill safety requirements of the vehicle driving in the automated mode.

In an example, the driver's reaction is at least one of steering, counter-steering, applying higher or less torque on a steering wheel, changing a hand position on the steering wheel, glancing or gazing on road, and interacting via pedal. The driver may react to the at least one modified driving parameter. Since the driving parameter may be applied various propulsive actuator unit, the driver's reaction may also differ based on a character of the modified driving parameter. For instance, if the control unit modifies the driving parameter regarding a position of the vehicle within a lane such that the vehicle temporarily drives offset from a center of the lane, the driver may steer to direct the vehicle to the center of the lane. Additionally or alternatively, the driver may firmly grasp the steering wheel and/or look around the surroundings, which may be detected by the driver monitoring unit. Accordingly, the driver controlling system may allow selectively altering characteristics or control of the vehicle to refresh driver's engagement in a variety of ways.

In an example, the control unit is configured to modify at least one of the driving parameter regularly in a defined period and/or irregularly. The control unit may modify the at least one driving parameter regularly in a defined period and/or irregularly regardless of any external input such as driver data to control whether the driver is actively engaged in the supervision of the automated driving mode.

In an example, the driver controlling system further comprises a user interface unit to generate a signal in case of insufficient reaction of the user to the modified driving parameter. In case the control unit does not detect sufficient reaction or even any reaction of the driver to the modified the driving parameter, the control unit may generate a warning signal to the driver via a user interface device.

The warning signal may be a graphical signal, a light signal, a sound signal, kinematic signal, haptic signal and/or a multimodal combination thereof. The user interface unit may comprise for instance a graphical user interface element, which may be integrated in the vehicle, e.g. a Center Stack Display (CSD), an Infotainment Head Unit (IHU). Additionally or alternatively, the user interface unit may be integrated in an infotainment system of the vehicle.

According to the present disclosure, a vehicle is presented. The vehicle comprises a driver controlling method as described above. The vehicle may be able to drive at least partially or entirely in an automated/autonomous driving mode. The vehicle comprising the driver controlling system may allow a driver to be engaged in a supervision of the driving by temporarily modifying at least one driving parameter. Accordingly, a safe driving of the vehicle may be ensured.

According to the present disclosure, a driver controlling method for a vehicle is presented. The method comprises, but not necessarily in this order:
applying at least one driving parameter in an automated driving mode of the vehicle,
modifying the at least one driving parameter of the automated driving mode by a defined rate of deviation for causing a reaction of a driver, and
generating driver engagement data based on the reaction of the driver to the at least one modified driving parameter.

The at least one driving parameter is based on a driving preference of the driver.

According to the present disclosure, a computer program element is presented. The computer program element is configured for a driver controlling system as described above. The program element is adapted to perform the method steps as described above, when being executed by a processing element.

It should be noted that the above examples may be combined with each other irrespective of the aspect involved. Accordingly, the method may be combined with structural features and, likewise, the system may be combined with features described above with regard to the method.

These and other aspects of the present examples will become apparent from and elucidated with reference to the examples described hereinafter.

BRIEF DESCRIPTION OF DRAWINGS

Exemplary aspects will be described in the following with reference to the following drawings.

DETAILED DESCRIPTION

Figure 1:
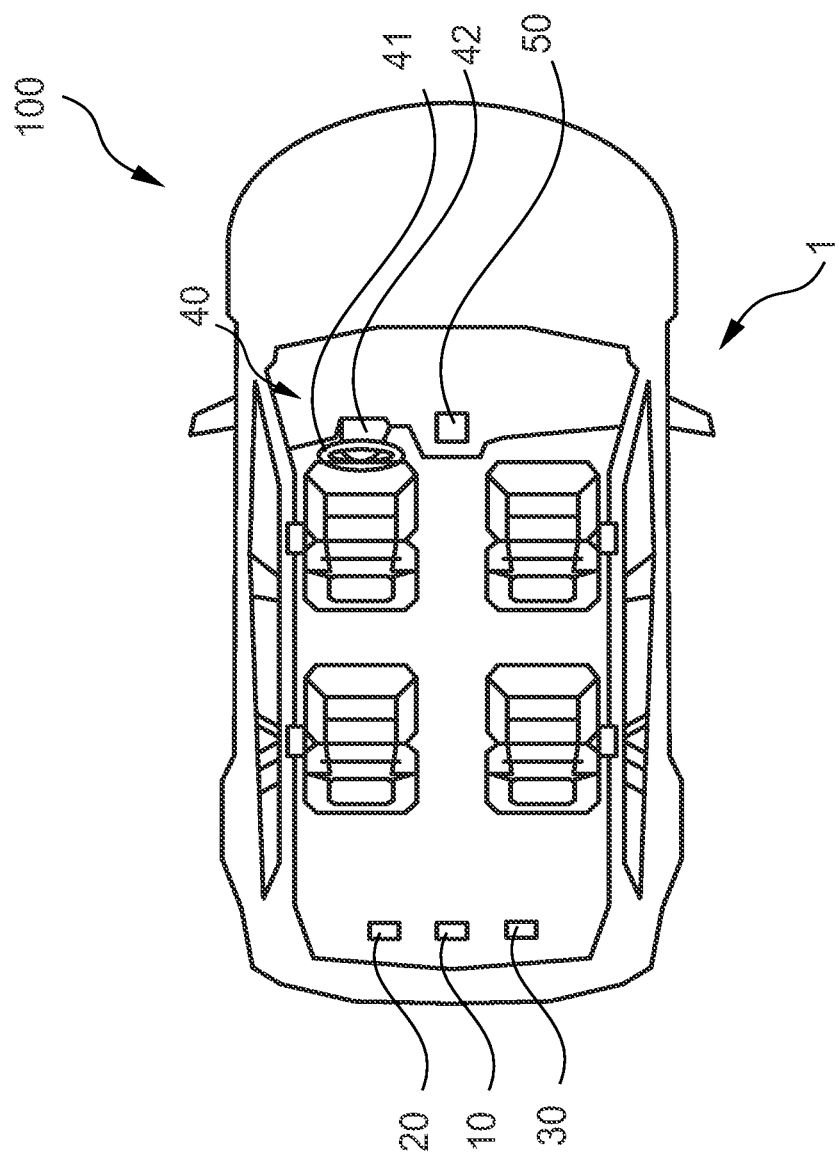
FIG. 1 shows schematically and exemplarily an example of a vehicle comprising the driver controlling system according to the present disclosure.

FIG. 1 shows a vehicle 100 comprising a driver controlling system 1. The vehicle 100 may be operated at least partially or entirely in an automated driving mode. The driver controlling system 1 is configured to monitor a driver, whether the driver actively supervises the automated driving mode of the vehicle 100. The driver controlling system 1 may be a part of a driver assistance system, which may allow the vehicle 100 to take over operational decisions during driving. The vehicle 100 in the automated mode provides a continuous assistance to the driver such as speed control and/or steering assistance and the driver remains actively in the supervising task.

The driver controlling system 1 comprises a propulsive actuator unit 10 and a control unit 30. The propulsive actuator unit 10 is arranged in the vehicle 100. The control unit 30 is configured to determine at least one driving parameter to propel the vehicle 100 in the automated mode. The driving parameter is based on a change of kinematics of the vehicle 100. The driving parameter comprises at least one of a distance to a preceding vehicle, a position in a lane, curve entry time, curve exit time, a curve entry speed, curve exit speed, an overriding torque, a turning speed, an acceleration rate and a deceleration rate. In other words, the driving parameter to be temporarily modified may be selected such that the modified driving parameter may influence the kinematics and/or a positioning into a specific situation of the vehicle, which diverges from a normal familiar positioning, even when the kinematics of a maneuver are identical.

The propulsive actuator unit 10 is configured to receive the driving parameter determined by the control unit 30 and apply it to drive the vehicle 100 in the automated mode. The propulsive actuator unit may comprise for instance a longitudinal drive control means, a lateral drive control means, an electric front axle drive unit, an electric rear axle drive unit, a steering wheel actuator means, a brake unit or the like.

The driver controlling system 1 further comprises a propulsive sensor unit 20 configured to generate driver engagement data based on the reaction of the driver to the at least one modified driving parameter. The propulsive sensor unit 20 may be arranged at the propulsive actuator unit and configured to monitor whether the driver provide the reaction in response to the at least one modified driving parameter. The reaction may be a manual input of the driver to adjust the modified driving parameter to a primary driving parameter determined by the control unit for the automated driving mode. The driver's reaction may be at least one of steering, counter-steering, applying higher or less torque on a steering wheel, changing a hand position on the steering wheel, glancing or gazing on road, and interacting via pedal.

The driver controlling system 1 further comprises a driver sensor unit 40 configured to monitor the driver, particularly a posture of the driver, whether the driver supervises the vehicle 100 driving in the automated mode, and generate driver data. The driver sensor unit 40 may be based on a contact on a steering wheel of the driver and/or an optical image of the driver.

The driver sensor unit 40 comprises a hand-on wheel detection system 41 comprising at least one capacitive sensor element and a torque sensor element. The hand-on wheel detection system 41 is configured to detect whether the driver holds the steering wheel and generate accordingly the steering wheel contact data. Additionally or alternatively, the driver sensor unit 40 comprises a camera-based driver monitoring system 42 configured to capture at least one of gaze direction, gaze pattern and fixation point of the driver. Particularly, the camera-based driver monitoring system 42 may monitor, if the driver observes surroundings through a windshield of the vehicle 100 and generate accordingly gaze data. Accordingly, the driver monitoring data may comprise at least the steering wheel contact data and/or the gaze data.

The control unit 30 may be an electronic control unit (ECU) of the vehicle 100 and configured to perform a powertrain control, brake control and/or transmission control. The control unit 30 is configured to modify the at least one of the driving parameter to be applied in the vehicle 100 by a defined rate of deviation for causing a reaction of the driver. The rate of deviation can be so small that it can just cause a reaction of the driver wittingly or unwittingly. It is important that the modified driving parameter(s) should still fulfill safety requirements of the vehicle 100 driving in the automated mode (see also FIG. 2).

In particular, by slightly modifying at least one driving parameter applied in the automated driving mode to propel the vehicle, the driver may perceive a deviation of a driving path and take over a physical control of the vehicle and/or change his/her behavior. In case of insufficient or no reaction of the driver to the modified driving parameter, the control unit may consider it as an insufficient or no engagement and/or supervision of the driver. Accordingly, the driver's engagement and/or supervision in the driving task may be actively measured or even gauged based on if and how large their reaction is.

The control unit 30 is further configured to modify the at least one driving parameter prior to a maneuver required depending on a road situation undergoing in a change. Additionally or alternatively, the control unit 30 may modify the at least one driving parameter regularly in a defined period and/or irregularly regardless of any external input such as driver engagement data and/or driver monitoring data.

The control unit 30 is further configured to modify two or more driving parameters of the automated driving mode and the propulsive sensor unit 20 is configured to identify at which modified driving parameter the driver provides the reaction. The propulsive sensor unit 20 may be configured to generate the driver engagement data based on the driver's reaction to the various modified driving parameters. The driver engagement data may comprise a degree of the reaction of the driver. The propulsive sensor unit may be able to not only detect the reaction of the driver to the modified driving parameter but also measure an intensity of the reaction.

The control unit may assess based on the driver engagement data whether the driver's reaction is sufficient to consider as an active engagement in the driving task or not. Accordingly, the control unit 30 may assess to which modified driving parameter the driver mostly reacts and the control unit 30 may be able to select a driving parameter to be modified in the future to control the engagement of the driver during the automated driving mode.

The control unit 30 is further configured to vary the rate of deviation for modifying the at least one driving parameter of the automated mode based on the driver engagement data and/or driver monitoring data. The control unit 30 is further configured to modify the at least one driving parameter incrementally from a prior modified driving parameter by the defined rate of deviation, in case of insufficient reaction of the driver. For instance, if the control unit 30 determines that the driver does not sufficiently pay attention to the surroundings, the control unit 30 may increase the rate of deviation.

The driver controlling system 1 further comprises a user interface unit 50 to generate a signal in case of insufficient or no reaction of the driver to the modified driving parameter. The user interface unit 50 may comprise for instance a graphical user interface element, which may be integrated in the vehicle 100, e.g. a Center Stack Display (CSD), an Infotainment Head Unit (IHU). Additionally or alternatively, the user interface unit 50 may be integrated in an infotainment system of the vehicle 100.

Figure 2A:
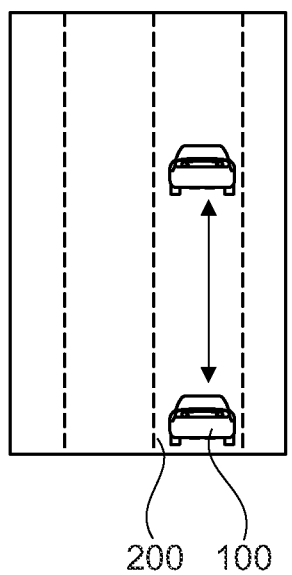
FIG. 2a, 2b, 2c show schematically and exemplarily an example of a driver controlling method by modifying a longitudinal driving parameter according to the present disclosure.
Figure 2B:
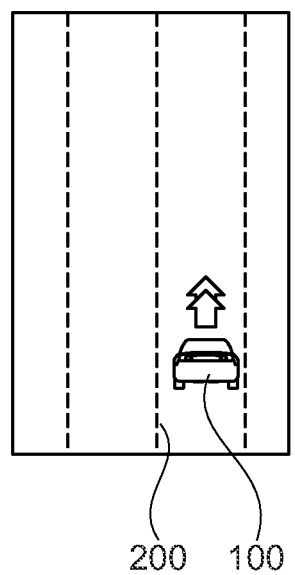
Figure 2C:
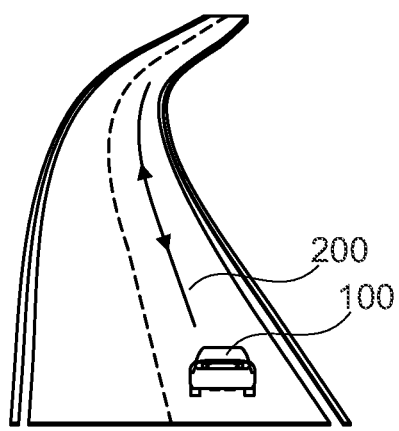

FIG. 2a, FIG. 2b and FIG. 2c show a vehicle 100 driving with at least one modified longitudinal driving parameter. The control unit 30 of the driver controlling system 1 may temporarily modify the longitudinal driving parameter to cause a reaction of the driver. If there is at least one preceding vehicle 100 ahead, a distance between the current vehicle 100 occupied by the driver and the preceding vehicle may be extended and/or shortened by accelerating or decelerating the vehicle 100. Similarly, in case of a presence of the preceding vehicle 100, a relative speed between two vehicles may be increased or decreased by accelerating or decelerating the vehicle 100 (see FIG. 2a).

However, if there is no preceding vehicle, the control unit 30 may just modify a current speed of the vehicle 100 by accelerating or decelerating by a defined rate of deviation (see FIG. 2b). Furthermore, in case of a cut-in or cut-out situation of the preceding vehicle 100 the acceleration rate or the deceleration rate may be also modified. In addition, the longitudinal driving parameter may also comprise a cornering speed of the vehicle 100, which may be modified for causing a reaction of the driver (see FIG. 2c).

It has to be noted that examples of the disclosure are described with reference to different subject matters. In particular, some examples are described with reference to method type claims whereas other examples are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed examples. Other variations to the disclosed examples can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A driver controlling system for a vehicle, comprising:
   a propulsive actuator unit;
   a propulsive sensor unit; and
   a control unit,
      the control unit being configured to prompt the propulsive actuator unit to apply at least one driving parameter in an automated driving mode of the vehicle,
      the at least one driving parameter being based on a driving preference of a driver,
      the control unit being further configured to modify the at least one driving parameter of the automated driving mode by a defined rate of deviation for causing a reaction of the driver, and
      the propulsive sensor unit being configured to generate driver engagement data based on the reaction of the driver to the at least one modified driving parameter.

2. The driver controlling system according to claim 1, the driver engagement data comprising a degree of the reaction of the driver.

3. The driver controlling system according to claim 1, the control unit being further configured to modify two or more driving parameters of the automated driving mode and the propulsive sensor unit being further configured to identify at which of the two or more modified driving parameters the driver provides the reaction.

4. The driver controlling system according to claim 1, the at least one driving parameter being based on a change of kinematics of the vehicle, the at least one driving parameter comprising at least one of a distance to a preceding vehicle, a position in a lane, curve entry time, curve exit time, a curve entry speed, curve exit speed, an overriding torque, a turning speed, an acceleration rate, or a deceleration rate.

5. The driver controlling system according to claim 1, the control unit being configured to modify the at least one driving parameter prior to a maneuver required depending on a road situation undergoing in a change.

6. The driver controlling system according to claim 1, further comprising a driver sensor unit configured to monitor the driver to determine whether the driver supervises the vehicle driving in the automated driving mode, and generate driver monitoring data.

7. The driver controlling system according to claim 6, the driver sensor unit being based on a contact on a steering wheel of the driver and/or an optical image of the driver.

8. The driver controlling system according to claim 6, the control unit being configured to vary the defined rate of deviation for modifying the at least one driving parameter based on at least one of the driver engagement data or the driver monitoring data.

9. The driver controlling system according to claim 1, the control unit being further configured to modify the at least one driving parameter incrementally from a prior modified driving parameter by the defined rate of deviation, in case of insufficient reaction of the driver.

10. The driver controlling system according to claim 1, the driver's reaction being at least one of steering, countersteering, applying higher or less torque on a steering wheel, changing a hand position on the steering wheel, glancing or gazing on road or interacting via pedal.

11. The driver controlling system according to claim 1, the control unit being configured to modify the at least one driving parameter regularly in a defined period or irregularly.

12. The driver controlling system according to claim 1, further comprising a user interface unit to generate a signal in case of insufficient reaction of the driver to the at least one modified driving parameter.

13. A vehicle comprising a driver controlling system, the driver controlling system comprising:
    a propulsive actuator unit;
    a propulsive sensor unit; and
    a control unit,
        the control unit being configured to prompt the propulsive actuator unit to apply at least one driving parameter in an automated driving mode of the vehicle,
        the at least one driving parameter being based on a driving preference of a driver,
        the control unit being further configured to modify the at least one driving parameter of the automated driving mode by a defined rate of deviation for causing a reaction of the driver, and
        the propulsive sensor unit being configured to generate driver engagement data based on the reaction of the driver to the at least one modified driving parameter.

14. A driver monitoring method, comprising:
    applying, by a propulsive actuator unit of a driver controlling system of a vehicle, at least one driving parameter in an automated driving mode of the vehicle;
    modifying, by a control unit of the driver controlling system, the at least one driving parameter of the automated driving mode by a defined rate of deviation for causing a reaction of a driver; and
    generating, by a propulsive sensor unit of the driver controlling system, driver engagement data based on the reaction of the driver to the at least one modified driving parameter,
    the at least one driving parameter being based on a driving preference of the driver.

15. A non-transitory computer-readable medium having instructions stored thereon that, in response to execution, cause a driver controlling system of a vehicle to perform operations comprising:
    applying, by a propulsive actuator unit of the driver controlling system, at least one driving parameter in an automated driving mode of the vehicle;
    modifying, by a control unit of the driver controlling system, the at least one driving parameter of the automated driving mode by a defined rate of deviation for causing a reaction of a driver; and
    generating, by a propulsive sensor unit of the driver controlling system, driver engagement data based on the reaction of the driver to the at least one modified driving parameter,
    the at least one driving parameter being based on a driving preference of the driver.

16. The non-transitory computer-readable medium according to claim 15, the driver engagement data comprising a degree of the reaction of the driver.

17. The non-transitory computer-readable medium according to claim 15, the operations further comprising:
    modifying, by the control unit, two or more driving parameters of the automated driving mode;
    identifying, by the propulsive sensor unit, which of the two or more modified driving parameters causes the driver to provide the reaction.

18. The vehicle according to claim 13, the driver engagement data comprising a degree of the reaction of the driver.

19. The vehicle according to claim 13, the control unit being further configured to modify two or more driving parameters of the automated driving mode and the propulsive sensor unit being further configured to identify which of the two or more modified driving parameters causes the driver to provide the reaction.

20. The driver monitoring method according to claim 14, further comprising:
    modifying, by the control unit, two or more driving parameters of the automated driving mode;
    identifying, by the propulsive sensor unit, which of the two or more modified driving parameters causes the driver to provide the reaction.

* * * * *